April 15, 1969 L. GIL DE GIBAJA 3,439,357
DETECTION SYSTEMS
Filed Nov. 12, 1965 Sheet 3 of 3

Leonidas Gil de Gibaja
INVENTOR

BY Jacobi & Davidson
ATTORNEYS 3,439,357
DETECTION SYSTEMS
Leonidas Gil de Gibaja, 19—19 21st Drive,
Long Island City, N.Y. 11105
Filed Nov. 12, 1965, Ser. No. 507,311
Int. Cl. G08b 13/26
U.S. Cl. 340—258                                   4 Claims

ABSTRACT OF THE DISCLOSURE

A novel circuit arrangement is disclosed for detecting the presence of intruding objects by sensing changes in electrical capacitance occurring in response to the intruding object. The circuit arrangement is such that the frequency of an oscillator is changed by capacitance variations occurring in response to the intruder to thereupon reduce the output level of a band-pass filter tuned to the normal center freqency of the oscillator. When the output level is reduced by a predetermined amount, an alarm is triggered. The novel circuit arrangement further includes means to simultaneously determine the existence of predetermined other external conditions and in this regard, a photoelectric arrangement responsive to polarized, coded light is also provided as is a novel interconnection of temperature responsive fusable links, the alarm arrangement being energized in a different manner when the temperature sensitive elements respond than would be the case when an intruder is detected.

---

The present invention relates generally to systems for detecting the presence of intruding objects by sensing changes in electrical capacitance occurring in response to the intruder. More particularly, the invention relates to an object intruding sensing system wherein the frequency of an oscillator is changed by capacitance variations that occur in response to the intruder, whereupon the output level of a bandpass filter tuned to the normal center frequency of the oscillator is reduced to trigger an alarm.

Object detectors for determining the presence of an intruding object, e.g. a burglar, by sensing capacitance increases resulting from the intrusion are known to the art. Many of the prior art systems have employed an oscillator, the frequency of which is changed in response to intruder capacity. The frequency variation has been sensed, in the prior art, with a bandpass filter adjusted to a center frequency lower than the normal frequency of the oscillator, whereby the oscillator output is normally blocked. When intrusion occurs, the oscillator frequency is shifted so a signal is coupled through the bandpass filter to activate an aural and/or visual indicator, that can be locally or remotely located.

One difficulty with the described prior art systems is that only capacity changes within a very limited range are effective to tune the oscillator so a signal is derived from the bandpass filter. Thus, if the intruder capacity is larger or smaller than expected, the oscillator frequency is respectively too low or high to be passed through the bandpass filter and the indicator is not activated.

According to the present invention, a bandpass filter having a center frequency coincident with the normal frequency of an oscillator is provided so that an indicator remains unactivated as long as the filter output is above a predetermined level. The oscillator frequency is shifted in response to its capacitance being varied by the intruder to a value that cannot be passed through the filter. Therefore, all capacitance variations above a predetermined amount cause the indicator to be activated, in contrast with the described prior art devices.

A further feature of the invention is that a second security violation transducer, different from the intruder capacitance sensing element, can be employed to trigger the same indicator activator as is energized by the capacitance sensor but in a different manner. For example, the indicator is energized constantly in response to an intruder being detected but is intermittently activated if the other transducer senses an unsafe condition. In the case of combined burglar and fire alarms, e.g., this feature is particularly desirable because it enables the type of security failure to be ascertained while enabling the system to be simple and inexpensive.

According to a further aspect of the invention, it can be selectively utilized as a door bell activator and fire indicator rather than intruder and fire alarm. When employed as a door bell activator, the aural indicator is energized in response to the capacity of a person at the building threshold, and is energized only at that time. In contrast, the indicator remains activated even after a person leaves the threshold if the system is switched to function as a burglar alarm.

Another aspect of the invention involves its use as a remote control system for opening a garage door. When utilized as such, a transducer responsive to a predetermined signal emitted by a vehicle is connected in the oscillator network and the indicator activator causes a motor for opening the door to function. The door closes automatically after the indicator activator is de-energized. In response to a vehicle emitting a signal to which the transducer responds, the oscillator output amplitude decreases to a value that enables energization of the indicator activator, whereby the door opens and the vehicle can enter the garage. By locating the oscillator capacitance sensing leads at the garage threshold, the door cannot commence its downward travel until the vehicle is in the garage.

It is, accordingly, an object of the present invention to provide a new and improved system for detecting the presence of intruding objects.

Another object of the invention is to provide a new and improved system for detecting the presence of intruding objects and at least one other parameter.

A further object of the invention is to provide a new and improved combined burglar and fire alarm system that utilizes the same indicator activating element for both alarms but derives different indications for them.

An additional object of the present invention is to provide a capacitance responsive intruder alarm system wherein capacity deviations from the normal are not required to be within a predetermined range.

Still another object of the system is to provide a combined burglar and fire alarm system wherein a single indicator is activated in response to the output of a bandpass filter dropping below a predetermined level when either sensed parameter occurs.

Yet a further object of the invention is to provide a new and improved system adapted for use as a burglar alarm, fire alarm and door bell activator, which system requires a minimum of parts, is inexpensive and easily maintained.

An additional object of the invention is to provide a garage door activator responsive to a predetermined signal from a vehicle, as well as to the capacity of the vehicle.

The above and still further objects, features and advantages of the present invention will become apparent upon consideration of the following detailed description of one specific embodiment thereof, especially when taken in conjunction with the accompanying drawings, wherein.

Figure 1:
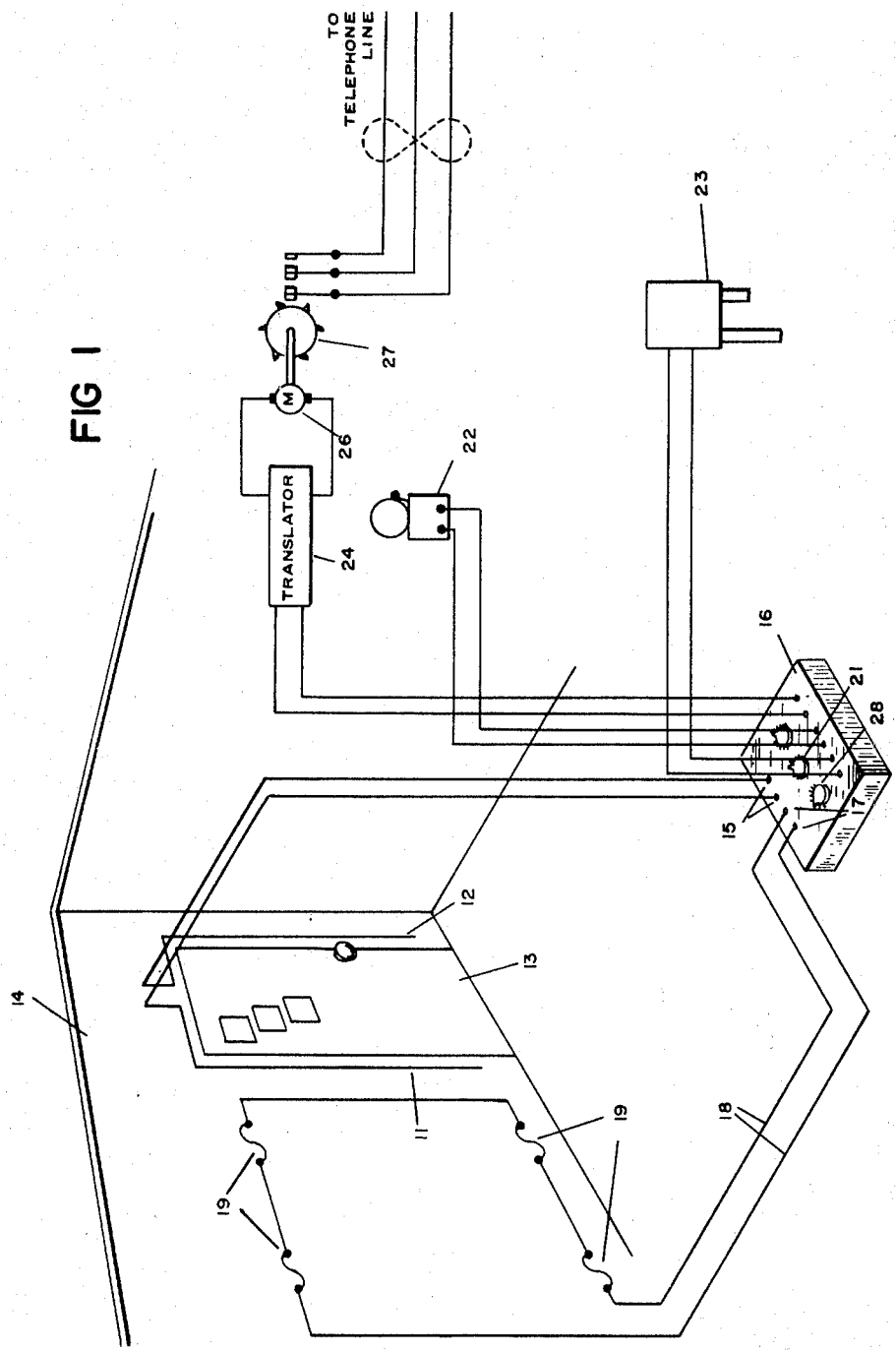
FIGURE 1 is a diagrammatic illustration of a typical environment with which the present invention may be employed.

Reference is now made to FIGURE 1 wherein bifilar leads 11 and 12 are placed around doorway 13 in an outside wall 14 of a dwelling, for example. Spaced leads 11 and 12, employed for sensing the electrical capacitance changes that occur with the presence of an intruder in proximity to door 13, are connected to one pair of signal input terminals 15 of control circuit 16. Circuit 16 is provided with control knob 21 that sets the level wherein an output is derived from it in response to capacitance variations at doorway 13. If the system is used to detect the presence of burglars, i.e. intruders who cross through doorway 13, knob 21 is set in a manner whereby an output is derived from circuit 16 only in response to relatively large increased capacitance between leads 11 and 12. To the contrary, when the system is employed as a doorbell actuator, the mere proximity of an intruder should be sufficient to activate the output of circuit 16; hence the circuit output is energized if a small increase in capacity is sensed by leads 11 and 12, as determined by the setting of knob 21.

The other pair of signal input terminals 17 for circuit 16 is connected via leads 18 to fusible elements 19, embedded in or hung on wall 14. In response to the high temperatures accompanying a fire, fusible elements 19 rupture, to provide a signal that activates circuit 16.

Three separate output indicating elements are selectively connected to a single energizing means in circuit 16, namely; alarm bell 22, chimes 23, or translator 24. To control whether the circuit including bell 22, chimes 23 or translator 24 is activated, a switch controlled by knob 28 is provided within circuit 16. When someone is on the premises, knob 28 is adjusted so that an indicator energizing output from circuit 16 is supplied to bell 22 or chimes 23, located within the building. When the premises are vacated, however, knob 28 is positioned so that translator 24 is activated to the exclusion of bell 22 and chimes 23.

Translator 24 includes conventional circuitry, not shown, for activating motor 26 to control telephone dialing mechanism 27 in a manner whereby a certain emergency number is telephoned in response to circuit 16 feeding an output signal to translator 24. After the emergency number has been dialed, the translator is connected into a telephone line to transmit a coded message indicative of the location of the dialing phone.

Figure 2:
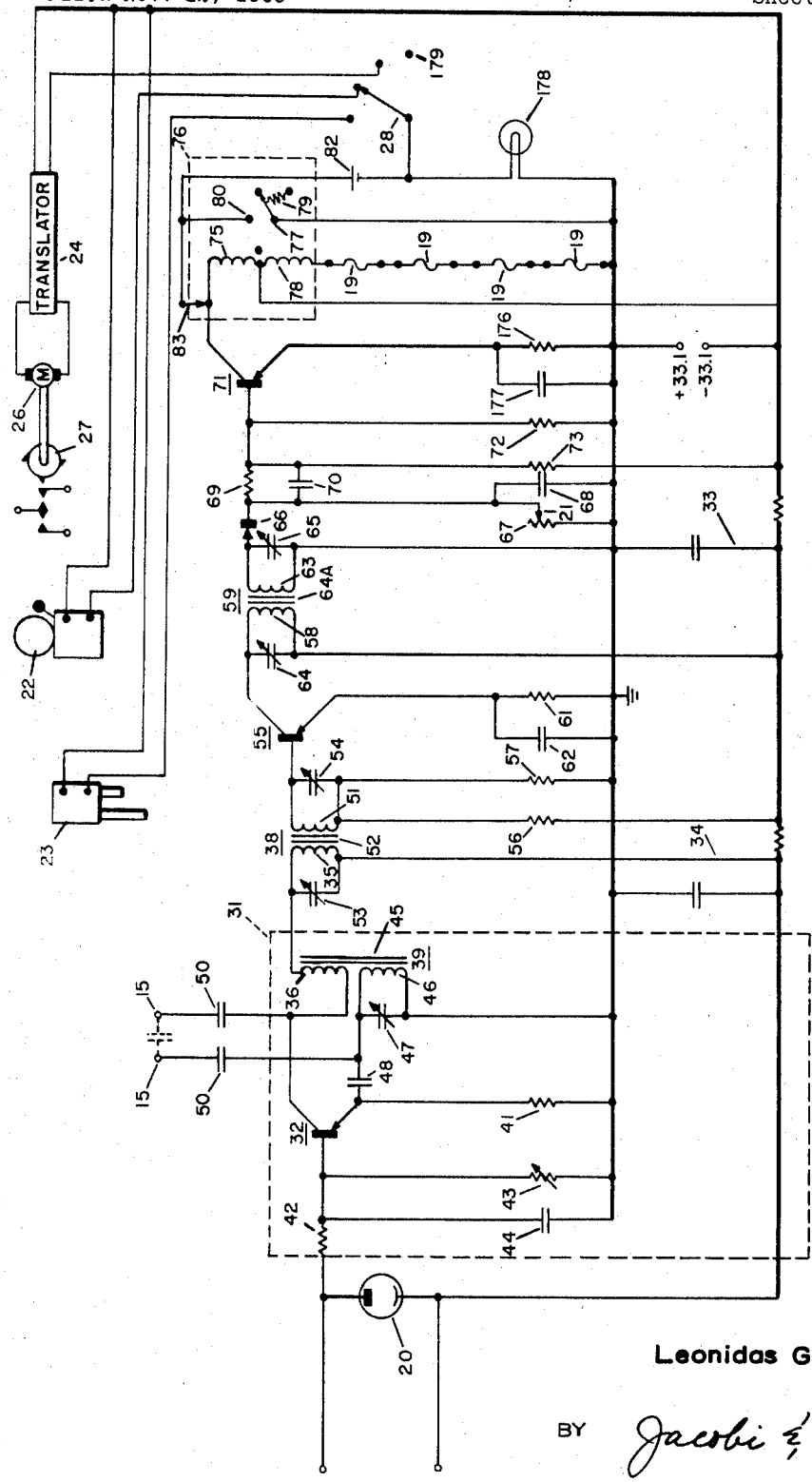
FIGURE 2 is a circuit diagram of a preferred embodiment of the invention.

A preferred embodiment for circuit 16 is illustrated in FIGURE 2 of the drawings that includes tickler transistor oscillator 31. Oscillator 31 comprises PNP transistor 32 having its collector emitter path energized in response to the D.C. potential applied through cascaded resistance capacitance ladder filter networks 33 and 34 from the 12 volt D.C. potential between terminals 33.1. Filters 33 and 34 are connected across transformers 38 and 59 to decouple signals in the primary winding of the former from the secondary winding of the latter. The D.C. potential across filter 34 is fed to transistor 32 through the transistor emitter self bias resistor 41 and the primary windings 35 and 36 of transformers 38 and 39, respectively. Transformer 38 also comprises a secondary winding 51 that is A.C. coupled to primary winding 35 via core 52. Windings 35 and 51 are shunted by tuning capacitors 53 and 54, respectively, which are adjusted so that transformer 38 is a bandpass filter having a center frequency equal to the normal predetermined output frequency of oscillator 31. Transformer 38, in addition to serving as a bandpass filter, comprises a relatively high Q parallel, tuned circuit load for the oscillator.

Base emitter bias for transistor 32 is from lead 33 through silicon photocell 20 and current limiting resistor 42, whence to lead 34 via the parallel combination of variable biasing resistor 43 and by-pass capacitor 44.

Under quiescent conditions, photocell 20 is not illuminated so that it presents a large impedance to the base of transistor 32. In response to light impinging on photocell 20, the base of transistor 32 is forward biased sufficiently to change the oscillator frequency materially.

The frequency deriving from oscillator 31 is determined, to a large extent, by the degree of coupling through core 45 of transformer 39 between windings 36 and 46, the timing capacitance 47 across the latter winding; and the capacitance between the emitter and collector of transistor 32. The total capacitance across transistor 32 comprises the series combination of D.C. decoupling capacitors 50 and the stray capacity between terminals 15 that are connected to sensing leads 11 and 12. A.C. coupling from the tank circuit including secondary winding 46 to the emitter of transistor 32 is through D.C. blocking capacitor 48.

Oscillator 31 is set to a predetermined frequency, e.g. 500 kc., by adjusting tuning capacitor 47. In response to the capacity between leads 11 and 12 being increased when an intruder comes close to or into contact with doorway 13 or in response to the base of transistor 31 being heavily forward biased in response to light impinging on photocell 20, the frequency deriving from oscillator 31 decreases. The frequency and amplitude of the oscillator output decrease together because of the lower shunt impedance transformer 38 presents to primary winding 36 at lower frequencies.

The high frequency oscillations coupled through transformer 38 are fed to the base of PNP high frequency amplifying transistor 55. Base bias for transistor 55 is derived through sceondary winding 51 from the tap between resistors 56 and 57 that are connected between leads 33 and 34. Base collector energization for transistor 55 is through primary winding 58 of transformer 59 and the by-passed, self bias emitter network comprising resistor 61 and capacitor 62. Transformer 59 includes secondary winding 63 that is coupled to primary winding 58 via core 64. Each of windings 58 and 63 is respectively shunted by separate tuning capacitors 64 and 65 that adjust the resonant frequency of transformer 59 to be coincident with the normal frequency deriving from oscillator 31 and provide another high Q (about 50) parallel tuned circuit. As the frequency of oscillator 31 decreases from its normal value in response to increased capacity between leads 11 and 12, the signal amplitude coupled through the bandpass filters comprising transformers 35 and 58 decreases. The signal level falls because of the increased attenuation of the bandpass filters to the lower frequencies and the lower amplitude output of oscillator 31.

The high frequency signal across secondary winding 63 is detected by the network including series connected germanium diode 66 poled to pass only the positive half cyles of the signal coupled to it, and the parallel combination of shunt connected variable resistor 67 and capacitor 68. Hence, there is derived across resistor 67 and capacitor 68 a positive D.C. voltage that is a direct function of oscillation frequency. The amplitude of the signal across capacitor 68, hence the sensitivity of the system, is determined by the value of resistor 67 that is controlled by knob 21. When the system is employed as a burglar alarm, the slider of resistor 67 is adjusted to be of low value while it has a large value when the system is utilized as a door chime activator. Adjustment of resistor 67 is automatic by ganging the slider thereof with switch 28 so the resistance has a low value when the switch is connected to chimes 23 and a large value for all other positions.

The signal across capacitor 68, at the detector output, is D.C. coupled by resistor 69 to the base of PNP D.C. amplifying transistor 71. The base of transistor 71 is also fed by the detector through pulse shaping capacitor 70 that is connected in parallel with resistor 69. With oscillator 31 deriving its normal predetermined output frequency, the positive D.C. signal coupled to the base of transistor 71 by resistor 69 is sufficient to overcome the forward bias applied to the transistor base by the negative D.C. voltage at the tap between resistors 72 and 73, that are connected across leads 33 and 34. Hence, transistor 71 is normally cut off and no current flows in the transistor collector circuit.

The collector circuit of transistor 71 includes the self biasing network comprising the parallel combination of resistor 176 with capacitor 177, as well as coil 75 of differential relay 76. Coil 75, when activated by negative current from the supply connected to terminals 33.1, drives relay contacts 77 in the counter-clockwise direction. In contrast, the other coil 78 of relay 76 is connected in series with fusible, heat responsive elements 19 across D.C. voltage terminals 33.1 to urge contacts 77 in the clockwise direction with about the same force as the field from coil 76. With no magnetic field applied to contact 77, spring 79 restores it to the unactivated position, resting on terminal 80. In other words, contact 77 rests on terminals 80 only in response to energization of both or neither of coils 75 and 78. If only one of coils 75 or 78 is activated, contact 77 is rotated away from terminal 80.

The indicator circuit, that is activated in response to contact 79 closing onto terminal 80, includes an independent, floating D.C. potential source 82, which is preferably a battery. Battery 82 is connected in series with the parallel combination of indicator lamp 178 and switch 28. The indicator circuit is also selectively connected across the series combination of coils 75 and 78 with fusible elements 19 via switch 83 that is ganged with switch 82 and the slider of variable resistor 67. Switch 83 is arranged such that the negative terminal of battery 82 is connected in circuit with coil 75 when the switch 28 is coupled to either bell 22 or translator 24, i.e. when it is desired to detect the presence of an intruder. In contrast, the contact of switch 83 is open circuited when activation of the door chime is desired.

In each position of switch 28, under normal operation, D.C. current flows through coil 78 from the source at terminals 33.1. Activation of coil 78 overcomes the bias of spring 79 to open the circuit from source 82 through lamp 178 and the circuits in parallel with it.

In response to an intrusion, as detected by the increased capacity between leads 11 and 12, the frequency of oscillator 31 lowers, resulting in a decrease in the positive D.C. signal amplitude across resistor 67 and capacitor 68. The decreased positive voltage across resistor 67 and capacitor 68 enables the base of transistor 71 to be forward biased in response to the negative voltage between resistors 72 and 73 to render the transistor in a heavily conducting state, thereby energizing coil 75.

Energizing coil 75 neutralizes the magnetic field of coil 78, whereby contact 77 is urged against terminal 80 to provide a low impedance path for battery 82 through lamp 178 and the circuits in parallel therewith.

If the circuit is adjusted so switch 83 is closed, the energization of coil 75 through the collector emitter path of transistor results in contact 77 being urged against terminal 80 until switch 83 is opened. Contact 77 is closed as described because of the latching circuit for coil 75 from negative terminal 33.1, through switch 83, terminal 80 and contact 77 to positive terminal 33.1. In consequence, lamp 178 and the circuits in parallel therewith provide a constant warning of the presence of an intruder. No warning is generated prior to energization of coil 75, despite the D.C. path from source 82 through lamp 175 via coils 75 and 78, as well as fusible elements 19, because the combined coil and fuse resistance is large enough to prevent sufficient current from being supplied to the indicators for activation thereof.

With switch 83 open circuited, the circuit is designed to activate chimes 23 and lamp 178 only when transistor 71 is activated. In response to a person or object leaving the vicinity of door 13, transistor 71 is cut off and current flow through coil 75 ceases because the latching circuit comprising contact 77 is not in circuit with the coil. Hence, the magnetic field from coil 78 again overcomes the bias of spring 79 to open circuit the low impedance path for source 82 and terminate energization of chimes 23.

With switch 83 closed, the circuit derives an intermittent output in response to one of fuses 19 rupturing. In such an event, current through coil 78 terminates whereby zero magnetic field is coupled to contact 78 and the contact is urged against terminal 80 to activate the indicator circuit. With contact 79 closed on terminal 80, current begins to flow from negative terminal 33.1 through coil 75, switch 83, contact 77 and positive terminal 33.1. In a predetermined time interval (on the order of one second), the current in coil 75 is sufficient to provide a magnetic field that overcomes the effect of spring 79 and contact 77 is rotated counter clockwise away from terminal 80. The low impedance path for the indicator circuit is now broken whereby lamp 178 and bell 22 are de-energized. In addition, the low impedance path to maintain current through coil 75 is broken and the coil magnetic field drops to a value that enables spring 79 to restore contact 77 to its position on contact 80. In the manner described, indicator lamp 178 and bell 72 continue to be intermittently energized and provide a different type of indication from the indication obtained when an intruder is sensed.

The circuit functions as a combined door chime activator and fire indicator to derive a continuous output for both situations by open circuiting contact 83. In response to a fire, at least one of fuses 19 is ruptured to de-energize coil 78. Thereby, no magnetic field is applied to contact 77, it is urged against terminal 80 by spring 79 and a continuous low impedance path is provided for indicator lamp 178 and chime 23 from source 82.

The use of the same type of signal for both the door chime activation and fire alarm functions is generally satisfactory because contact 83 should be open circuited only when someone is about the premises in which the equipment is installed. Of course, a person can readily ascertain if someone is in the vicinity of door 13 or if a fire is raging on the premises once chimes 23 are energized.

Figure 3:
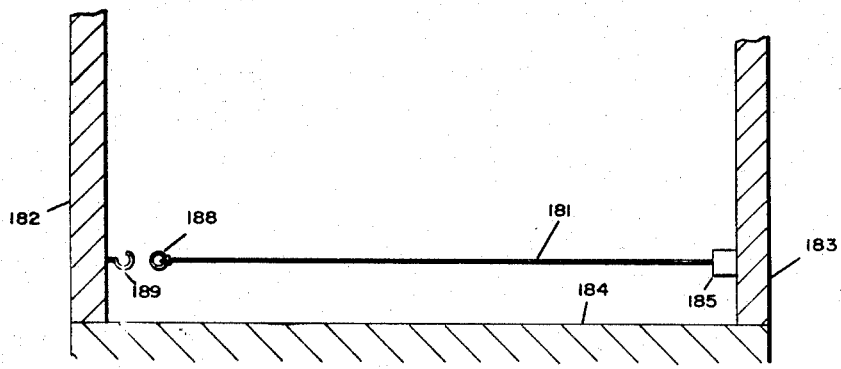
FIGURES 3 and 4 illustrate an embodiment of the invention wherein an easily installed sensing wire is employed.
Figure 4:
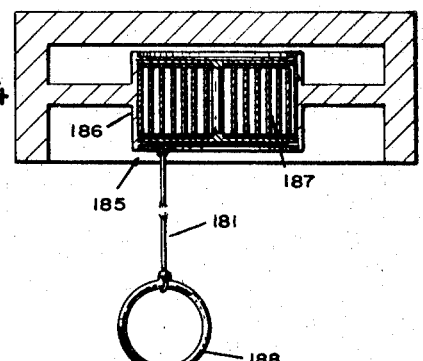

To provide increased sensitivity to detect the presence of a burglar in an area that is sought to be protected, and provide an easily installed system, the detector can be modified as shown by FIGURES 3 and 4 wherein a metallic, flexible wire 181 is selectively suspended between walls 182 and 183, slightly above floor 84, behind door 13 (FIGURE 1), at a position where it cannot be readily observed. Lead 181 is connected to one of terminals 15, the other terminal 15 being grounded to establish a predetermined capacity between the collector and emitter of transistor 32. Wire 181 is wound about reel 185, that is mounted in box 186 by torsion spring 187. Ring 188 is attached to the free end of wire 181 so the wire can be pulled from container 186, on wall 183, to hook 189, on wall 182. When ring 188 is released from hook 189, wire 181 is rewound on reel 185 in response to the returning force exerted by spring 187.

In use, when the area is to be protected from a burglar, wire 181 is attached to hook 189 immediately prior to authorized persons vacating the premises. After door 13 has been locked, switch 28 is rotated by an activator located outside of the protected room so that either bell 22 or translator 24 will be activated in response to a shift in the frequency of oscillator 31.

When a burglar enters the room being protected, the capacity between leads 15 is changed to decrease the frequency of oscillator 31 and activate coil 75. In certain instances, the capacity between terminals 15 is not increased sufficiently merely in response to the presence of the burglar and/or the door opening. The burglar will, however, as he proceeds into the room cross over, step on or under wire 181 to materially change the capacity between terminals 15. The change in capacity is invariably great enough to decrease the input level to transistor 71 to assure activation of relay 75.

Figure 5:
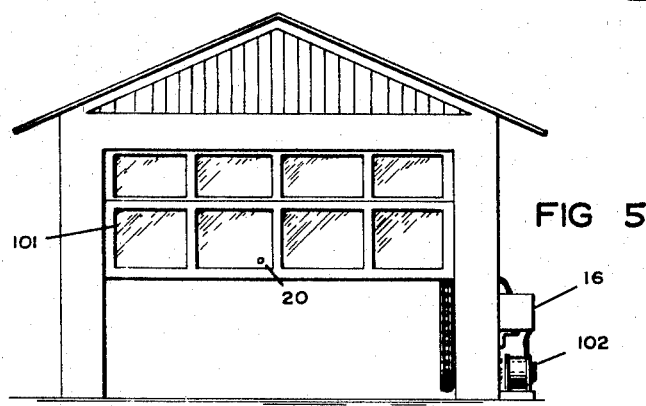
FIGURES 5 and 6 are diagrams illustrating how the present invention can be employed as a garage door activator.
Figure 6:
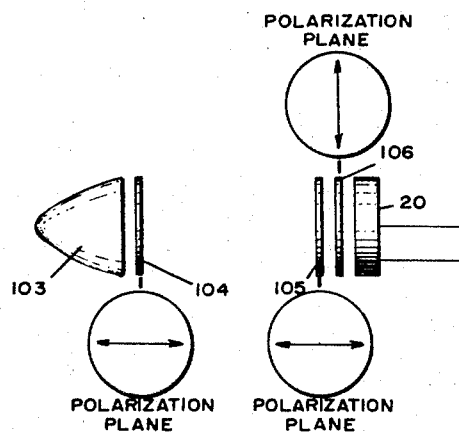

Reference is now made to FIGURES 5 and 6 to illustrate the manner in which the present invention is employed as a garage door activator. Mounted on garage door 101, at a height corresponding with the distance of a vehicle headlamp above the ground is photo-cell 20. Photo-cell 20 is connected in the base bias network of transistor 32 so that when not illuminated it has large impedance and no effect on the oscillator 31 output. In response to coded light beams from the headlamps of predetermined vehicles impinging on photo-cell 20, its impedance is decreased substantially. As discussed supra, substantial decreases in the impedance of photo-cell 20 causes conduction through the emitter collector path of transistor 71 whereby coil 75 is energized. In the embodiment of FIGURES 5 and 6, energization of coil 75 closes the contacts of a relay to connect induction motor 102 with the terminals of an A.C. power source. With motor 102 so activated, door 101 is raised and remains in that position as long as motor 102 is connected with the source. In response to motor 102 being decoupled from its source, door 101 returns by gravity to its closed condition.

The apparatus for deriving the coded light beams and for the detection thereof is illustrated in FIGURE 6. The scattered, white light emanating from headlamp 103 of a vehicle is polarized in a predetermined plane by polarizing sheet 104 that is placed immediately before lamp 103. The light coming through polarizing sheet 104, in the plane of polarization, is brighter than ambient light, as well as the light from another vehicle without a polarizer in the direction of sheet 104. Light in the plane of polarization deriving from sheet 104 is brighter than light, in that plane, from the other sources named because sheet 104 lines up the electric vectors of almost half of the light rays propagated through it while a very small percentage of white light is polarized in a predetermined plane.

The detector for the coded beam deriving from sheet 104 comprises polarizing sheets 105 and 106 that are stacked immediately in front of photo-cell 20. Sheets 105 and 106 have polarizing directions at right angles to each other, with the former having its polarization direction aligned with the direction of the light rays deriving from sheet 104. Filters 105 and 106 materially limit and set at a relatively constant level the amount of white unpolarized light that is coupled to cell 20. Because sheets 104 and 105 are polarized in the same direction, a considerable amount of light from lamp 103 is coupled to photo-cell 20, whereby the cell impedance is lowered as the vehicle containing lamp 103 and sheet 104 come close to door 101 and the door is opened.

Door 107 remains open after the vehicle has passed beneath it even though photo-cell 20 is no longer illuminated by the coded light beam. Coil 74 and motor 102 remain energized under these circumstances by imbedding capacitance leads 11 and 12 just inside the garage, behind door 101. Hence, as the vehicle passes over leads 11 and 12, the frequency of oscillator 31 is below the bandpass frequency of the I.F. amplifier stage and collector current flows in transistor 71 to maintain the energization circuit for motor 102. After the vehicle has passed leads 11 and 12 and progressed into the garage, oscillator 31 is restored to its normal frequency, transistor 71 is cut-off and door 101 lowers. It is to be understood that leads 11 and 12 are sufficiently removed from door 101 and the normal vehicle parking area to prevent spurous activation of coil 75.

I claim:

1. A system for detecting the presence of an intruding object that increases the capacity between a pair of spaced leads and for detecting further predetermined occurrences, said system comprising an oscillator having a tuned circuit; means for connecting said leads in the tuned circuit of said oscillator, said oscillator deriving a predetermined output frequency when there is no intruding object to increase the capacity between said leads; bandpass filter means responsive to the oscillator output, said bandpass filter means comprising a high Q parallel tuned circuit loading said oscillator and having a resonant frequency coincident with the predetermined output frequency of said oscillator; an amplitude detector means responsive to the output of said filter for deriving a signal varying in amplitude as a direct function of the output level of the signal deriving from said filter, said amplitude detector means including variable resistance means for selectively varying the level of the signal deriving from said detector means and adjusting the sensitivity of the system; an indicator activator responsive to the signal deriving from said detector means for deriving an indicator energizing signal only when the level of the detected signal decreases below a predetermined amplitude level, said indicator activator including a relay coil, a transistor having said relay coil connected in its output circuit, and means for forward biasing the base of said transistor into conduction to activate said relay coil; said detector including means for feeding to said transistor a DC voltage of such polarity and amplitude as to overcome the bias of said forward biasing means and bias said transistor so that said relay coil is deactivated in response to the filter output level dropping below a predetermined level; additional detecting transducer means for deriving a signal in response to a predetermined occurrence; and means for coupling the signal deriving from said additional detecting transducer means to said indicator activator for energization thereof.

2. The system as defined by claim 1 wherein said additional detecting transducer means comprises a photocell means responsive only to a coded lightwave impinging thereon polarized in a predetermined plane, said photocell means including means for polarizing lightwaves in two planes at right angles to each other, one of said two planes being said predetermined plane, said photocell means being coupled with said oscillator to reduce the output frequency of said oscillator.

3. The system as defined in claim 1, wherein said additional detecting transducer means comprises temperature responsive fuse means and circuit means for connecting said fuse means in circuit with said indicator activator, said circuit means including means for selectively activating said indicator activator intermittently in response to rupture of said fuse means or continuously in response to rupture of said fuse means.

4. The system of claim 3, wherein said indicator activator is continuously activated in response to the detected signal from said bandpass filter decreasing below said predetermined amplitude level.

(References on following page)

References Cited

UNITED STATES PATENTS

| | | | |
|---|---|---|---|
| 891,339 | 6/1908 | Hirt | 250—225 X |
| 1,917,245 | 7/1933 | Edwards et al. | |
| 2,108,202 | 2/1938 | Kelly | 340—258 X |
| 2,640,975 | 6/1953 | Roe et al. | 340—228 X |
| 2,696,603 | 12/1954 | Ekman | 340—227.1 X |
| 2,946,989 | 7/1960 | Loeber | 340—227.1 X |
| 3,067,364 | 12/1962 | Rosso. | |
| 3,162,848 | 12/1964 | Mulvey | 340—258 |

JOHN W. CALDWELL, *Primary Examiner.*

D. L. TRAFTON, *Assistant Examiner.*

U.S. Cl. X.R.

340—276, 227.1; 331—65, 66, 112; 250—221, 225